United States Patent
Deogun et al.

(10) Patent No.: US 11,653,388 B2
(45) Date of Patent: May 16, 2023

(54) FREQUENCY DIVISION MULTIPLEX RANDOM ACCESS CHANNEL RESOURCE CONFIGURATION AND SELECTION FOR NEW RADIO-UNLICENSED

(71) Applicant: QUALCOMM Incorporated, San Diego, CA (US)

(72) Inventors: Pravjyot Singh Deogun, Bengaluru (IN); Jing Sun, San Diego, CA (US); Xiaoxia Zhang, San Diego, CA (US); Ozcan Ozturk, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 16/742,558

(22) Filed: Jan. 14, 2020

(65) Prior Publication Data
US 2020/0267771 A1 Aug. 20, 2020

(30) Foreign Application Priority Data
Feb. 14, 2019 (IN) .............................. 201941005869

(51) Int. Cl.
*H04W 74/08* (2009.01)
*H04B 17/318* (2015.01)
*H04W 72/0453* (2023.01)

(52) U.S. Cl.
CPC ...... *H04W 74/0833* (2013.01); *H04B 17/318* (2015.01); *H04W 72/0453* (2013.01)

(58) Field of Classification Search
CPC ......... H04W 74/0833; H04W 72/0453; H04W 16/14; H04W 74/0808; H04B 17/318;
(Continued)

(56) References Cited

U.S. PATENT DOCUMENTS

2016/0192376 A1* 6/2016 Lee ...................... H04W 72/085
370/252
2019/0313449 A1* 10/2019 Tsai .................... H04W 74/085
(Continued)

OTHER PUBLICATIONS

Ericsson: "Enhancements to Initial Access Procedure," 3GPP Draft, 3GPP TSG-RAN WG1 Meeting AH#1901,R1-1900999, Enhancements To Initial Access Procedure, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593844, 12 pages, Retrieved from the Internet: URL: http://www.3gpp.org/ftp/Meetings%5F3GPP%5FSYNC/RAN1/Docs/R1%2D1900999%2Ezip [retrieved on Jan. 20, 2019], pp. 5-7,2.1.3 Random Access.
(Continued)

*Primary Examiner* — Faruk Hamza
*Assistant Examiner* — Aixa A Guadalupe Cruz
(74) *Attorney, Agent, or Firm* — Norton Rose Fulbright US LLP

(57) ABSTRACT

Frequency division multiplex (FDM) random access configuration and selection is disclosed for new radio (NR) unlicensed (NR-U) operations. For idle mode user equipment (UEs), the network may configured multiple frequency bands for random access. The UE may then select different frequencies for random access when default frequencies experience interference. For connected mode UEs, the network may configured which of multiple configured frequency bands the connected UE may use for autonomous random access transmissions. The UE may then select any of the allowed frequency bands for autonomous random access. Contention-free random access resources may be configured on one or more of the multiple configured frequency bands. When contention-free resources are available, the UEs may initially attempt access of the contention-
(Continued)

free resources on the default frequency band before attempting random access on other configured bands or the UE is provided a priority of bands for access by the network.

28 Claims, 9 Drawing Sheets

(58) Field of Classification Search
CPC ..... H04L 5/0055; H04L 5/005; H04L 5/0053; H04L 5/0058; H04L 27/0006; H04L 5/001; H04L 5/0048
See application file for complete search history.

(56) References Cited

U.S. PATENT DOCUMENTS

| | | | |
|---|---|---|---|
| 2019/0327769 A1* | 10/2019 | Yang | H04W 72/046 |
| 2020/0221506 A1* | 7/2020 | Jeon | H04W 74/0833 |
| 2020/0229241 A1* | 7/2020 | Jeon | H04W 74/0833 |
| 2020/0404708 A1* | 12/2020 | Zhang | H04W 16/14 |
| 2021/0153262 A1* | 5/2021 | Mochizuki | H04W 56/0045 |
| 2022/0007433 A1* | 1/2022 | Liu | H04W 74/0833 |
| 2022/0078718 A1* | 3/2022 | Hoshino | H04W 72/02 |

OTHER PUBLICATIONS

Huawei, et al., "Initial Access in NR Unlicensed," 3GPP Draft, 3GPP TSG RAN WG1 Ad-Hoc Meeting 1901,R1-1900061, 3rd Generation Partnership Project (3GPP), Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 20, 2019 (Jan. 20, 2019), XP051592987, 11 pages, Retrieved from the Internet: URL: http://www.3gpp.org/ftp/Meetings%5F3GPP%5FSYNC/RAN1/Docs/R1%2D1900061%2Ezip [retrieved on Jan. 20, 2019], pp. 5-7, 3 NR-U Physical RACH (PRACH) pp. 7-8, 4 Paging Occasion in Frequency Domain pp. 8-10, 5 Enhancement on PRM/RLM figure 5.

International Search Report and Written Opinion—PCT/US2020/013750—ISA/EPO—dated Mar. 25, 2020.

Qualcomm Incorporated: "Qualcomm Incorporated", 3GPP Draft, 3GPP TSG RAN WG1 Meeting #AH1901,R1-1900874, Initial Access and Mobility procedures for NR-U, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593720, 10 pages, Retrieved from the Internet: URL: http://www.3gpp.org/ftp/Meetings%5F3GPP%5FSYNC/RAN1/Docs/R1%2D1900874%2Ezip [retrieved on Jan. 20, 2019], pp. 6-7,2.1.3 Four-step RACH pp. 7-8,2.2 Mobility and RLM..

Samsung: "Discussion on Time/Freq-domain Enhancements for RACH Resources," 3GPP Draft, 3GPP TSG RAN WG1 Ad-Hoc Meeting 1901,R1-1901040, Enhancement To RACH, 3rd Generation Partnership Project (3GPP), Mobile Competence Centre, 650, Route Des Lucioles, F-06921, Sophia-Antipolis Cedex, France, vol. RAN WG1. No. Taipei, Taiwan, Jan. 21, 2019-Jan. 25, 2019, Jan. 20, 2019 (Jan. 20, 2019), XP051593885, 3 pages, Retrieved from the Internet: URL: http://www.3gpp.org/ftp/Meetings%5F3GPP%5FSYNC/RAN1/Docs/R1%2D1901040%2Ezip [retrieved on Jan. 20, 2019], the whole document.

ZTE, et al., "Discussion on Enhancement Initial Access Procedures for NR-U," 3GPP Draft, 3GPP TSG RAN WG1 Ad-Hoc Meeting 1901,R1-1900101, Discussion on Enhancement of the Initial Access Procedure for NR-U, 3rd Generation Partnership Project (3GPP), Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 20, 2019 (Jan. 20, 2019), XP051593027, 7 pages, Retrieved from the Internet: URL: http://www.3gpp.org/ftp/Meetings%5F3GPP%5FSYNC/RAN1/Docs/R1%2D1900101%2Ezip [retrieved on Jan. 20, 2019], pp. 7-8. 3 Enhancement of 4-step random access procedure p. 8, 4 Scheduling request (SR), figures 4,5.

* cited by examiner

FREQUENCY DIVISION MULTIPLEX RANDOM ACCESS CHANNEL RESOURCE CONFIGURATION AND SELECTION FOR NEW RADIO-UNLICENSED

CROSS-REFERENCE TO RELATED APPLICATIONS

This application claims the benefit of Indian Provisional Patent Application No. 201941005869, entitled, "FDM RACH RESOURCE CONFIGURATION AND SELECTION FOR NR-U," filed on Feb. 14, 2019, which is expressly incorporated by reference herein in its entirety.

BACKGROUND

Field

Aspects of the present disclosure relate generally to wireless communication systems, and more particularly, to frequency division multiplex (FDM) random access configuration and selection for new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes detecting, by a user equipment (UE), a random access configuration message identifying one or more random access occasions on a plurality of frequency bands, transmitting, by the UE, a random access request to a base station at a selected random access resource of the one or more random access occasions on a selected frequency band of the plurality of frequency bands, monitoring, by the UE, a downlink frequency for a random access response in response to the random access request, and transmitting, by the UE, a connection request to the base station in response to detection of the random access response.

In an additional aspect of the disclosure, an apparatus configured for wireless communication includes means for detecting, by a UE, a random access configuration message identifying one or more random access occasions on a plurality of frequency bands, means for transmitting, by the UE, a random access request to a base station at a selected random access resource of the one or more random access occasions on a selected frequency band of the plurality of frequency bands, means for monitoring, by the UE, a downlink frequency for a random access response in response to the random access request, and means for transmitting, by the UE, a connection request to the base station in response to detection of the random access response.

In an additional aspect of the disclosure, a non-transitory computer-readable medium having program code recorded thereon. The program code further includes code to detect, by a UE, random access configuration message identifying one or more random access occasions on a plurality of frequency bands, code to transmit, by the UE, a random access request to a base station at a selected random access resource of the one or more random access occasions on a selected frequency band of the plurality of frequency bands, code to monitor, by the UE, a downlink frequency for a random access response in response to the random access request, and code to transmit, by the UE, a connection request to the base station in response to detection of the random access response.

In an additional aspect of the disclosure, an apparatus configured for wireless communication is disclosed. The apparatus includes at least one processor, and a memory coupled to the processor. The processor is configured to detect, by a UE, a random access configuration message identifying one or more random access occasions on a plurality of frequency bands, to transmit, by the UE, a random access request to a base station at a selected random access resource of the one or more random access occasions on a selected frequency band of the plurality of frequency bands, to monitor, by the UE, a downlink frequency for a random access response in response to the random access request, and to transmit, by the UE, a connection request to the base station in response to detection of the random access response.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
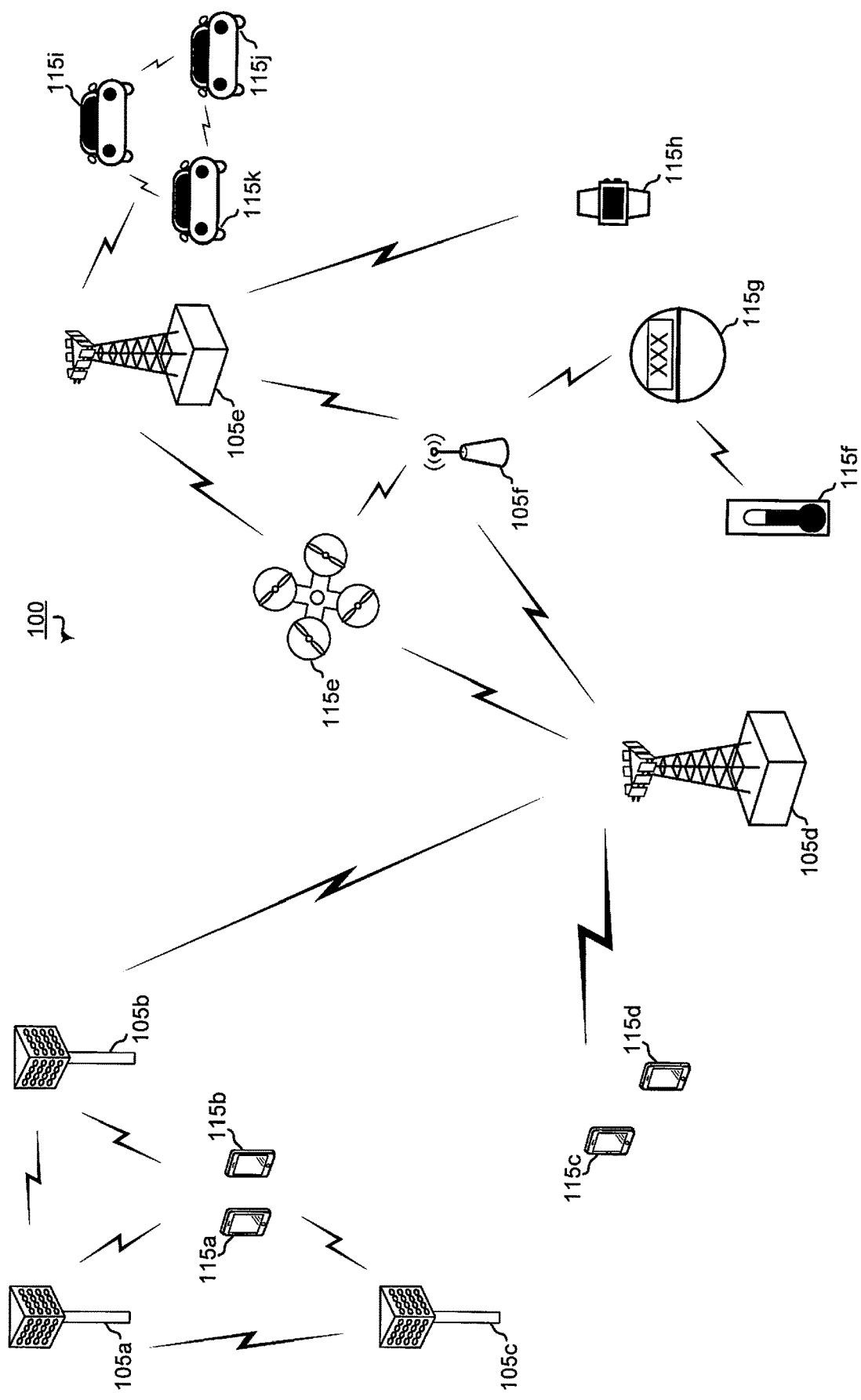
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
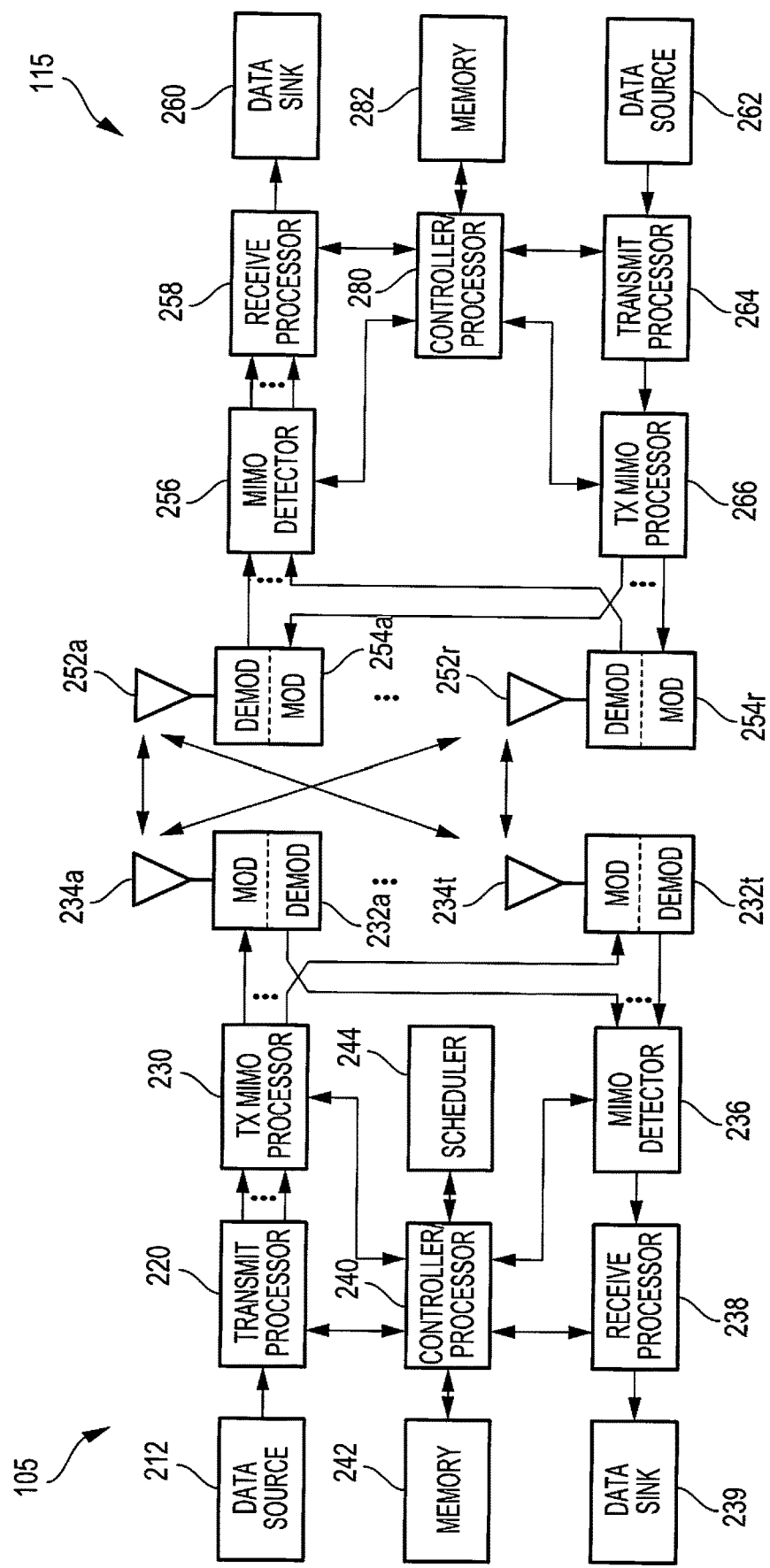
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
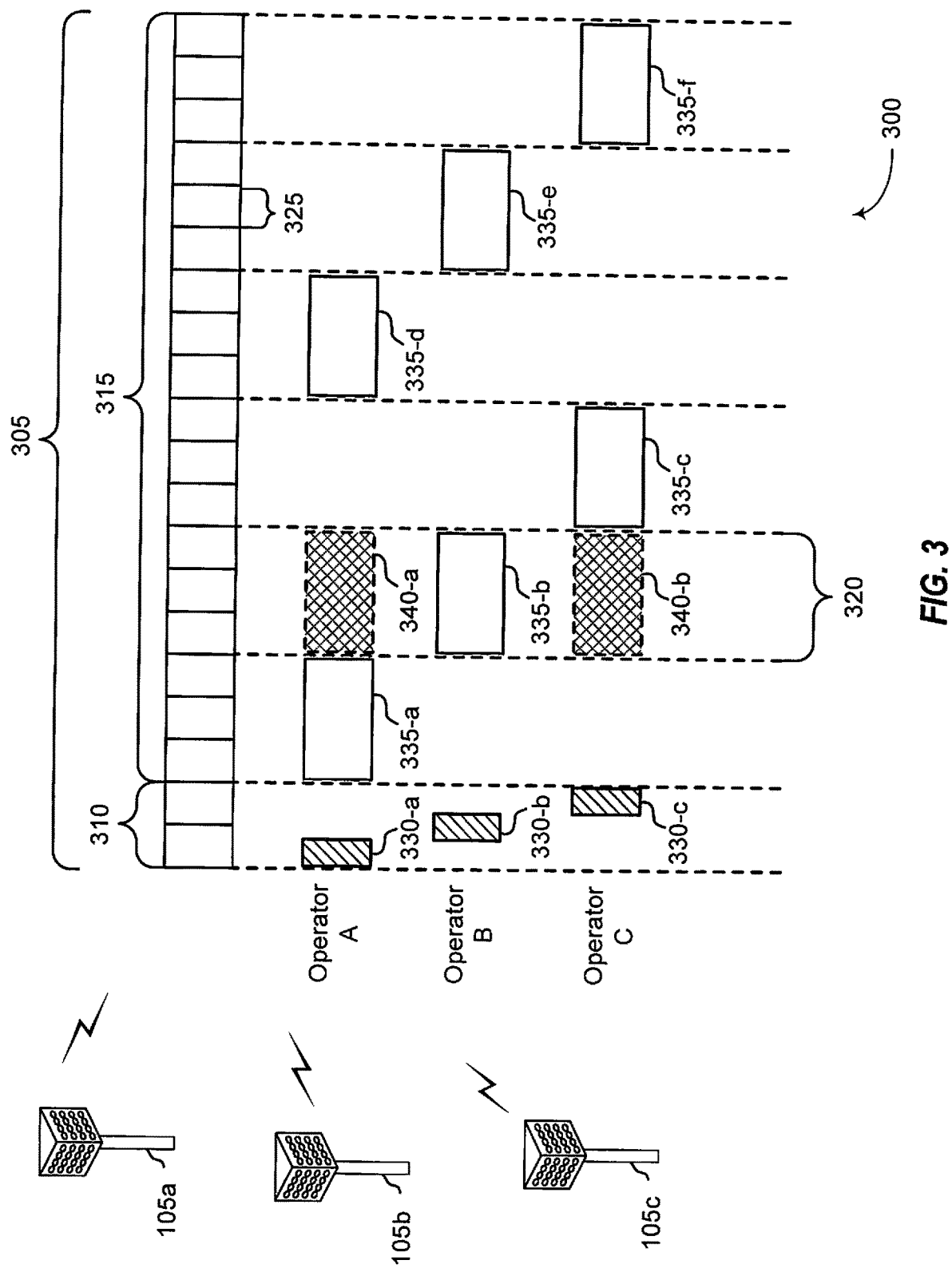
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* may be prioritized for Operator C, resources 335-*d* may be prioritized for Operator A, resources 335-*e* (e.g., G-INT-OpC) may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

One of the difficulties of using unlicensed band channels for services that demand a higher quality of service (QoS) is the channel acquisition failure caused by consistent listen before talk (LBT) failure. A similarly effect has also been seen in connection establishment of a cell as random access procedures can also be delayed due to consistent LBT failures. One suggestion to address these limitations has been to increase the number of random access occasions (e.g., PRACH occasions) in the time and/or frequency domains, thus, allowing more opportunities for the UE to access the channel. The various aspects of the present disclosure provide different proposed solutions for providing additional random access opportunities in the frequency domain.

Figure 4:
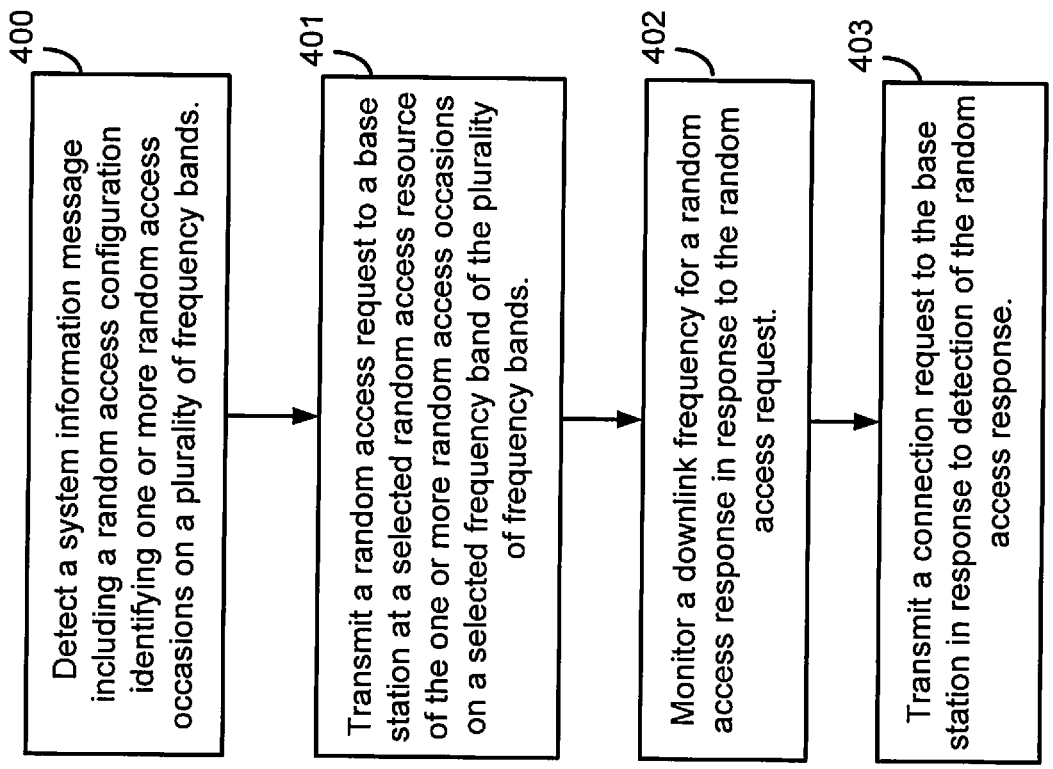
FIG. 4 is a block diagram illustrating example blocks executed to implement one aspect of the present disclosure.
Figure 9:
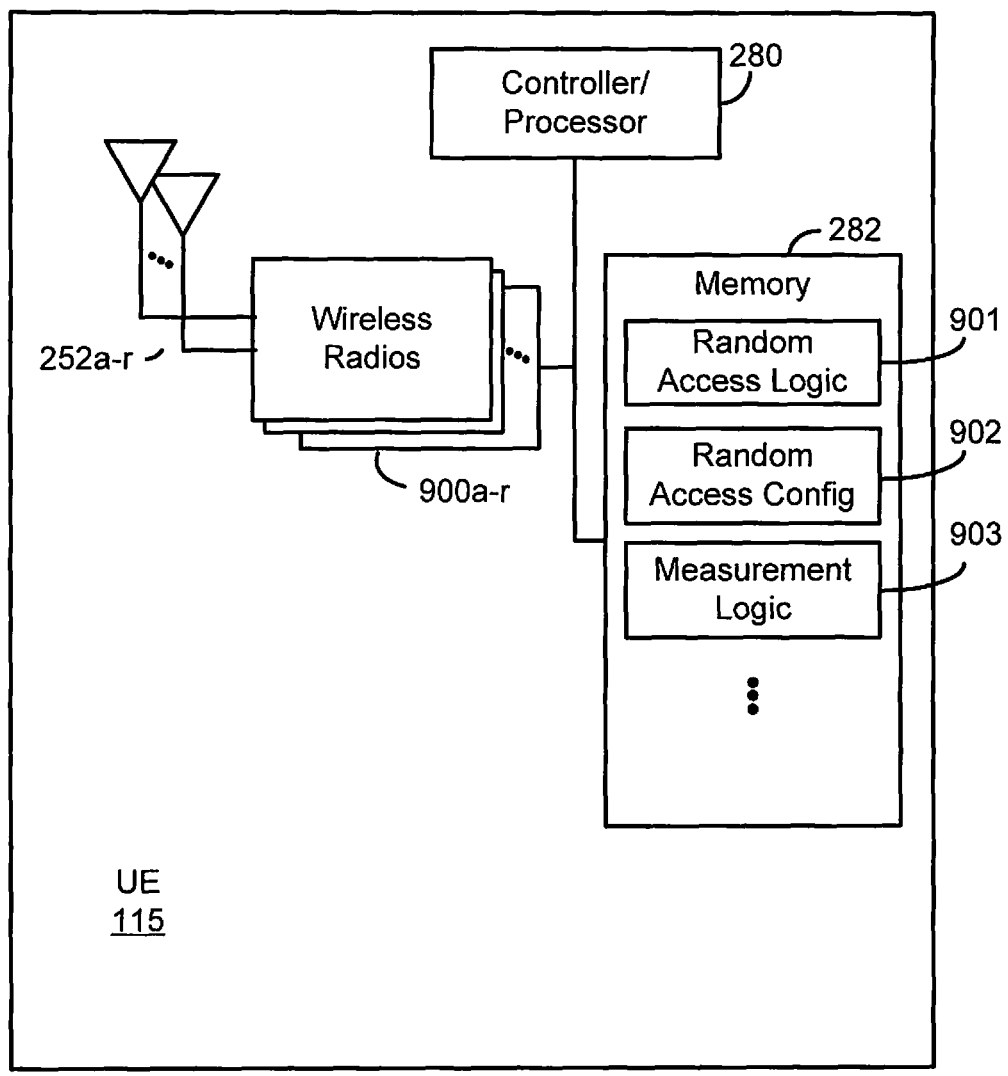
FIG. 9 is a block diagram illustrating an example UE configured according to aspects of the present disclosure.

FIG. 4 is a block diagram illustrating example blocks executed by a UE to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

For idle mode UEs, the initial active bandwidth part (BWP) may be fixed to 20 MHz bandwidth, which is assumed to be minimum bandwidth for performing LBT operation. Hence, LBT failure before PRACH occasion on initial active BWP implies that a UE may not be able to perform PRACH transmission. When there is high congestion observed in the initial active BWP, an idle mode UE may observe increased delays and a low reliability in sending random access transmissions.

At block 400, a UE detects a system information message, wherein the system information message includes a random access configuration identifying one or more random access occasions on a plurality of frequency bands. A UE, such as UE 115, may be in an idle mode and detect system information signals for a particular cell or base station via antennas 252a-r and wireless radios 900a-r. The network on which the cell or base station operates can configure multiple frequency bands for random access transmission using various system information broadcasts or signals, such as the remaining minimum system information (RMSI) signal, master information block (MIB), system information blocks (SIBs), and the like. One of these frequency bands may be the initial active BWP that UE 115 may be allocated for random access, while the other frequency bands may refer to a supplementary uplink carrier, an uplink BWP, or any individual frequency resources outside of the initial active BWP. Such additional frequency bands may be configured either only for random access transmissions (e.g., only configured with random access resources) or may be configured for all uplink channels and transmissions.

At block 401, the UE transmits a random access request to a base station at a selected random access resource of the one or more random access occasions on a selected frequency band of the plurality of frequency bands. As a part of the initial access random access procedure, UE 115, under control of controller/processor 280, executes random access logic 901, stored in memory 282. The execution environment of random access logic 901 provide the functionality for UE 115 to perform random access procedures. According to the initial access random access procedure, UE 115 may transmit a random access request, or Msg1 of the random access procedure, to the target base station via wireless radios 900a-r and antennas 252a-r.

At block 402, the UE monitors a downlink frequency for a random access response in response to the random access request. The downlink frequency monitored by UE 115 may be the downlink resource of the initial active BWP. Alternatively, other downlink resources may be configured associated with the additional frequency bands configured for the random access transmissions. For example, for each uplink BWP where random access resources are available, the network may configure a downlink BWP for random access response (RAR) reception. UE 115 would receive configuration of these specified downlink frequency band via configuration signals from a serving or target base station via antennas 252a-r and wireless radios 900a-r. If no such downlink BWP is configured for a supplementary uplink BWP, then UE 115 may receive the RAR within the downlink resources of the initial active BWP. In an optional aspect, for each supplementary uplink carrier configured for random access, the network may configure a supplementary downlink carrier to receive the RAR. This configuration may include physical cell identifier (PCI) information and other cell specific configuration. If no such downlink carrier is configured for a supplementary uplink carrier, UE 115 may receive the RAR within the primary downlink carrier where the synchronization signal block (SSB) is received.

At block 403, the UE transmits a connection request to the base station in response to detection of the random access response. Within the execution environment of random access logic 901, UE 115, upon successful receipt of an RAR message, would transmit a connection request or Msg3 of the random access procedure. The connection request would be transmitted to the target base station via wireless radios 900a-r and antennas 252a-r.

NR networks currently allow connected mode UEs, such as UE 115, to perform UE-triggered random access transmissions using only the random access resources of a primary cell (PCell) within the active BWP, if random access resources are available, and the initial active BWP. Because random access resources can be configured in non-active bandwidth parts and secondary cells, various additional aspects of the present disclosure provide for connected mode UEs to select one of the configured bandwidth parts/secondary cells for performing autonomous random access without receiving any random access trigger from a base station or the network during a radio resource control (RRC) connected state.

Figure 5:
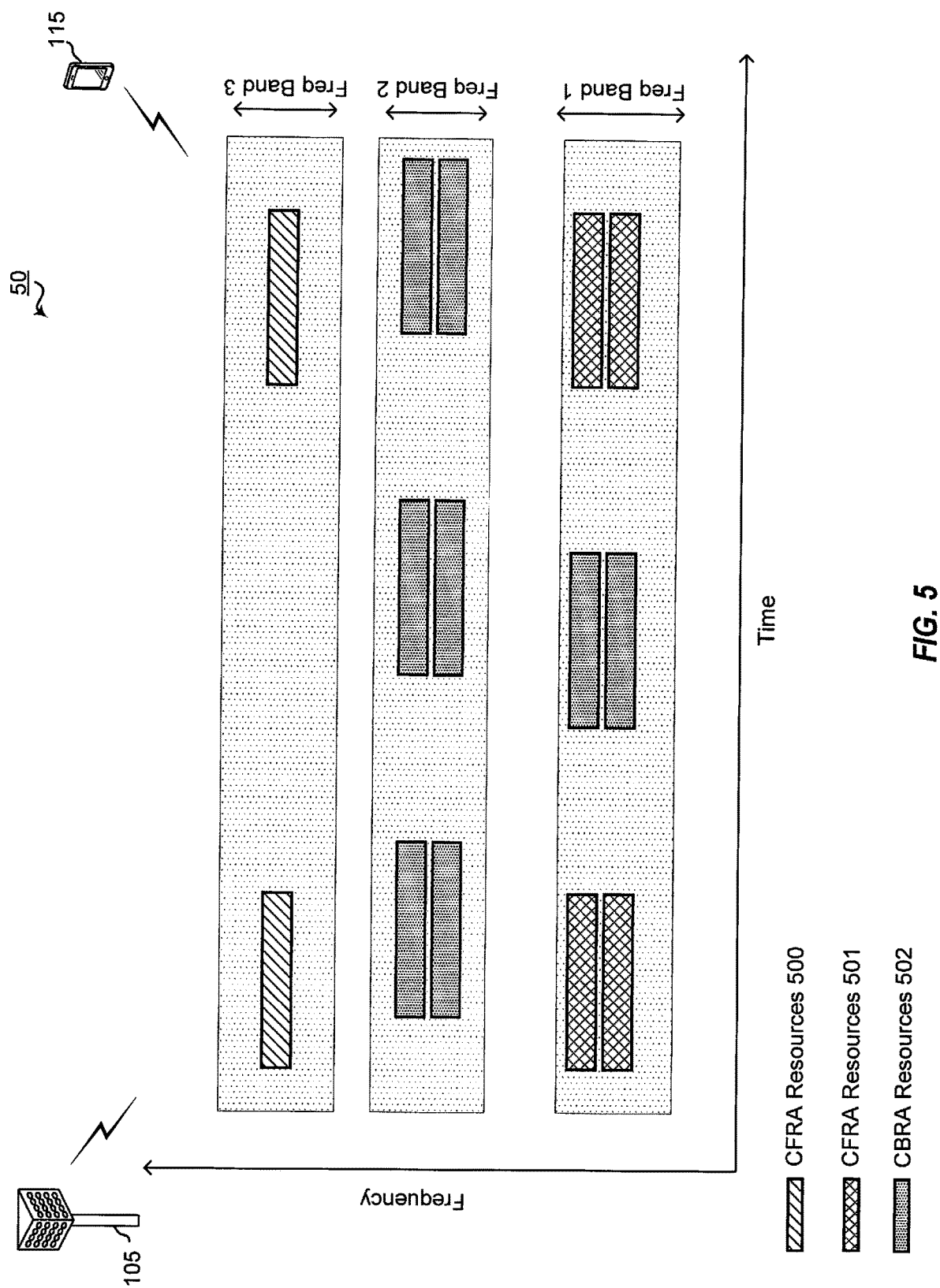
FIG. 5 is a block diagram illustrating a portion of a NR-U network having a base station and UE configured according to aspects of the present disclosure.

FIG. 5 is a block diagram illustrating a portion of NR-U network 50 having base station 105 and UE 115 configured according to aspects of the present disclosure. As illustrated, UE 115 is in a connected mode with base station 105. In one example aspect illustrated by FIG. 5, for a serving cell or BWP where random access resources are configured (e.g., frequency bands 1-3), the network can configure whether UE 115 can perform random access transmissions autonomously. According to a first optional aspect, base station 105 may signal a configuration message to UE 115 that indicates that UE 115 may perform autonomous random access on frequency band 1 and frequency band 3. As illustrated for the example aspect, frequency band 1 identifies as the default BWP (e.g., the initial access BWP or default BWP). Accordingly, where UE 115 determines to attempt autonomous random access for base station 105, it may use the configured random access resources on either frequency band 1 or 3.

It should be noted that alternative aspects of the present disclosure may provide for the default BWP to always be enabled as a default configuration known to UE 115. Thus, even where UE 115 fails to receive the autonomous random access configuration from base station 105, UE 115 may always elect to perform UE-triggered random access on the initial access BWP or default BWP.

Within the current standard provisions for NR release 15 (Rel-15), contention-free random access (CFRA) resources may be provided for a single BWP of a target cell. According to an additional aspect illustrated by FIG. 5, CFRA resources 500 and 501 may be configured in multiple cells or BWPs of the target node (e.g., frequency band 1 and frequency band 3). For example, CFRA resources 500 and 501 are configured for frequency bands 1 and 3. For purposes of the illustrated aspects of FIG. 5, each frequency band may represent a BWP, a supplementary uplink carrier, or a serving cell. Out of the given frequency bands, one frequency band can be configured as default frequency band. CFRA resources 500 configured in each of frequency band 1 and 3 are associated with a set of SSBs and/or CSI-RS(s). For example, the CFRA resources 500 of frequency band 1 may be associated with SSB-1, SSB-3, and SSB-5 (or CSI-RS-1, CSI-RS-3, and CSI-RS-5), and CFRA resources 501 of frequency band 3 may be associated with SSB-0 and SSB-2 (or CSI-RS-0 and CSI-RS-2). Contention-based random access (CBRA) resources are configured in each of frequency band 1 and frequency band 2. If UE 115 is unable to attempt random access transmissions using CFRA resources 500 and 501, it may revert to CBRA resources for attempting random access.

Figure 6:
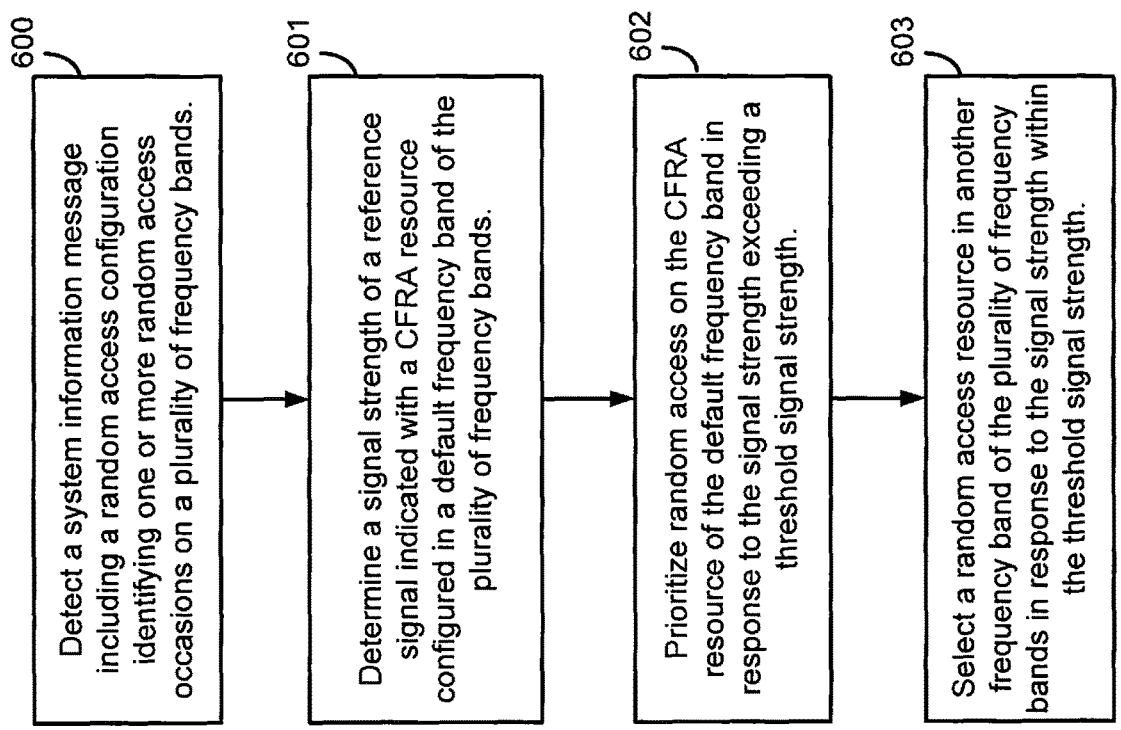
FIG. 6 is a block diagram illustrating a portion of a NR-U network having a base station and UE configured according to aspects of the present disclosure.

FIG. 6 is a block diagram illustrating example blocks executed to implement one aspect of the present disclosure. The example blocks will also be described with respect to UE 115 as illustrated in FIG. 9. As used herein, the phrase "frequency band" may refer to a bandwidth part (BWP), a supplementary uplink carrier, a serving cell, or a subband.

CFRA resources can be configured on a subset of random access occasions within a given frequency band. The remaining random access resources may contain CBRA resources. In current NR Rel-15 standards, which provides for configuration of CFRA resources on a single frequency band, a UE, such as UE 115, should use the frequency band where CFRA resources are configured. As noted previously, each such CFRA resource may be associated with a set of SSB or CSI-RS(s). UE 115 can use the CFRA resources when the signal strength of one of the associated SSB or CSI-RS(s) exceeds a predefined threshold signal strength. According to the aspects described herein, UE 115 can prioritize the default frequency bands where CFRA resources are configured, but may revert to any of the remaining frequency bands when the signal strength of the reference signal associated with the CFRA resources fails to exceed the threshold.

At block 600, detects a random access configuration message identifying one or more random access occasions on a plurality of frequency bands. The random access configuration message may include a system information message, such as a master information block (MIB), system information block (SIB), remaining minimum system information (RMSI), or the like. A UE, such as UE 115, may detect the random access configuration message through system information signals or dedicated semi-static signals for a particular cell or base station via antennas 252*a-r* and wireless radios 900*a-r*. As noted previously, the network on which the cell or base station operates can configure multiple frequency bands for random access transmission using various system information broadcasts or semi-static configuration signals, such as the RMSI MIB, SIBs, dedicated RRC messages, and the like. One of these frequency bands may be the default or initially active frequency band that UE 115 may be allocated for random access, while the other frequency bands may refer to a supplementary frequency band (e.g., uplink carrier, an uplink BWP, or any individual frequency resources outside of the initial active BWP). All of the available frequency bands would have various random access resources allocated or configured thereon, whether CFRA or CBRA resources. The random access configuration information, including the multiple frequency bands and the identification of CFRA and CBRA resources may be stored in memory 282 at random access configuration 902. If CFRA resources are configured, for example, in the default frequency band, UE 115 would prioritize the default frequency band for performing random access.

At block 601, the UE determines a signal strength of a reference signal indicated with a CFRA resource configured in a default frequency band of the plurality of frequency bands. When determining to perform a random access procedure, whether UE-triggered or triggered from network signaling, UE 115, under control of controller/processor 280, executes random access logic 901. The execution environment of random access logic 901 provides UE 115 the functionality of performing the random access procedure. Within the execution environment of random access logic 901, UE 115 determines the signal strength of the reference signal (e.g., SSB, CSI-RS, etc.) associated with the CFRA resources allocated on the default frequency band. Under control of controller/processor 280, UE 115 executes measurement logic 903, in memory 282, to provide the measurement functionality. The relevant reference signals received via antennas 252*a-r* and wireless radios 900*a-r* are measured for signal strength.

At block 602, the UE prioritizes random access on the CFRA resource of the default frequency band in response to the signal strength exceeding a threshold signal strength. Within the execution environment of random access logic 901, UE 115 determines whether the measured signal strength of the reference signal associated with the CFRA resources exceeds a predefined threshold. When any of the reference signals associated with the CFRA resources satisfy the random access transmission criteria (e.g., exceeds the threshold signal strength), UE 115 selects the default frequency band where the CFRA resources are available for random access transmissions.

At block 603, the UE selects a random access resource in another frequency band of the plurality of frequency bands in response to the signal strength within the threshold signal strength. After measuring the signal strength of the reference signal associated with the CFRA resources on the default frequency band in block 602 using measurement logic 903, if the measured signal strength fails to meet the threshold, then UE 115 can select any other of the configured multiple frequency bands where random access resources are available. The other frequency bands may also be configured with either CBRA or CFRA resources, or both.

According to additional aspects, a fallback priority may provide for UE 115 to select one of the other frequency bands where CFRA resources are configured when the random access criteria are not met on the default frequency band. In such additional aspect, would again evaluate the random access criteria of the newly selected frequency band (e.g., measure the reference signals corresponding to the CFRA resources of the new frequency band. UE 115 may then transmit random access transmissions using the CFRA resources of the newly selected frequency band if the random access criteria are met (e.g., signal strength exceeding the threshold) or further fallback to the CBRA resources on any of the configured frequency bands.

Figure 7:
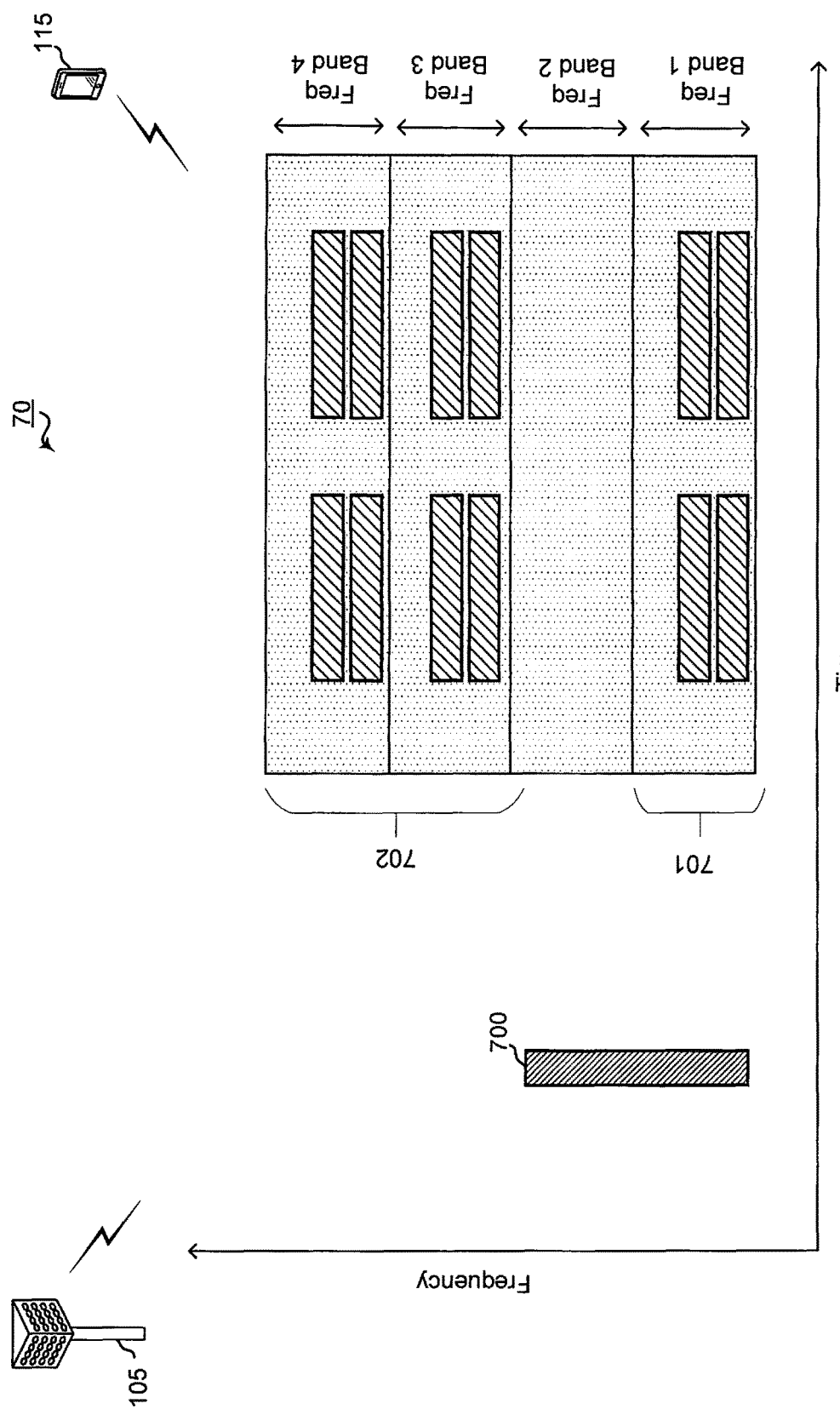
FIG. 7 is a block diagram illustrating a portion of a NR-U network having a base station and UE configured according to aspects of the present disclosure.

FIG. 7 is a block diagram illustrating a portion of NR-U network 70 having base station 105 and UE 115 configured according to aspects of the present disclosure. NR-U network 70 has configured four frequency bands for communications between base station 105 and UE 115. According to the random access configuration, random access occasions 703 are configured on frequency bands 1, 3, and 4. The random access configuration identifies frequency bands 3 and 4 for performing an LBT. However, when a network has acquired the channel for transmissions, a UE, such as UE 115, may experience a higher rate of success when performing random access transmissions on the frequency bands within the acquired channel. For non-standalone deployments or scheduled uplink (SUL)-based deployments, a downlink control signal instruction (e.g., PDCCH instruction or order) can be transmitted using a primary downlink channel irrespective of the random access resource used in the uplink random access transmissions. Downlink control signal instruction in such case may provide the frequency band (e.g., cell, BWP, subband, etc.) where the network has acquired channel occupancy time (COT). For example, when base station 105 has obtained access to the channel, it may transmit a downlink control signal instruction 700 that identifies that base station 105 has acquired a COT in frequency band 1.

In scenarios in which there is a wideband BWP, downlink control signal instruction 700 can indicate the specific subbands where base station 105 has acquired the COT. UE 115 can use downlink control signal instruction 700 to prioritize the random access resources for specific ones of frequency bands 1-4. As noted, each of frequency bands 1-4 may include a BWP, a cell, or a subband. Accordingly, after receiving downlink control signal instruction 700, UE 115 may prioritize frequency band 1-701 for performing random access, even where frequency bands 3 and 4-702 were prioritized for random access within the random access configuration.

In an alternative aspect, downlink control signal instruction 700 can indicate the specific frequency band that UE 115 can use to prioritize for random access. Downlink control signal instruction 700 may also indicate the channel access priority to be used for the indicated frequency band. For example, downlink control signal instruction 700 may indicate a time value for which the frequency band information and channel access priority are deemed valid. Depending on the capabilities of UE 115, with the information on the time duration provided within downlink control signal instruction 700 for using the identified frequency bands, UE 115 may perform random access only on the identified frequency band(s), frequency band 1, as illustrated in FIG. 7. Alternatively, where UE 115 is capable of performing LBT on multiple frequency bands simultaneously, UE 115 would perform an LBT procedure on one or more of the configured frequency bands in parallel. Of the one or more frequency bands on which the LBT procedure succeeds, if the identified frequency band was one of the bands with the successful LBT, UE 115 would select to perform random access transmission on the identified frequency band. For example, UE 115 may perform an LBT procedure on frequency bands 1, 3, and 4 simultaneously. When UE 115 detects a successful LBT on frequency bands 1 and 3, it may use the prioritization information in downlink control signal instruction 700 to select frequency band 1-701 for random access transmissions.

In an additional aspect of the present disclosure illustrated by FIG. 7, base station 105 transmits the PDCCH instruction or order using the subbands or frequency bands where base station 105 has acquired the COT. This information can be used by UE 115 to prioritize random access resources for a specific subband(s). According to the illustrated additional aspect, base station 105 acquires a COT in frequency bands 1 and 2. Base station 105 then transmits downlink control signal instruction 700 over frequency bands 1 and 2. UE 115 would then prioritize the random access resources corresponding to frequency band 1, where downlink control signal instruction 700 is received.

As described above, downlink control signal instruction 700 may indicate a time value for which the network has acquired COT. In such case, UE 115 may use an abbreviated LBT procedure (e.g., category 2 LBT) for the random access resources within frequency band 1, where downlink control signal instruction 700 is received for the time duration indicated by downlink control signal instruction 700. Again, depending on the capabilities of UE 115, UE 115 may perform random access only on one of the identified frequency bands where downlink control signal instruction 700 is received. Otherwise, where UE 115 is capable of performing LBT on multiple frequency bands simultaneously, UE 115 may perform an LBT procedure on one or more of the configured frequency bands (e.g., frequency bands 1, 3, and 4) in parallel and, where one of the frequency bands on which downlink control signal instruction 700 is received has a successful LBT, UE 115 may perform random access transmission on that frequency band (e.g., frequency band 1).

Figure 8:
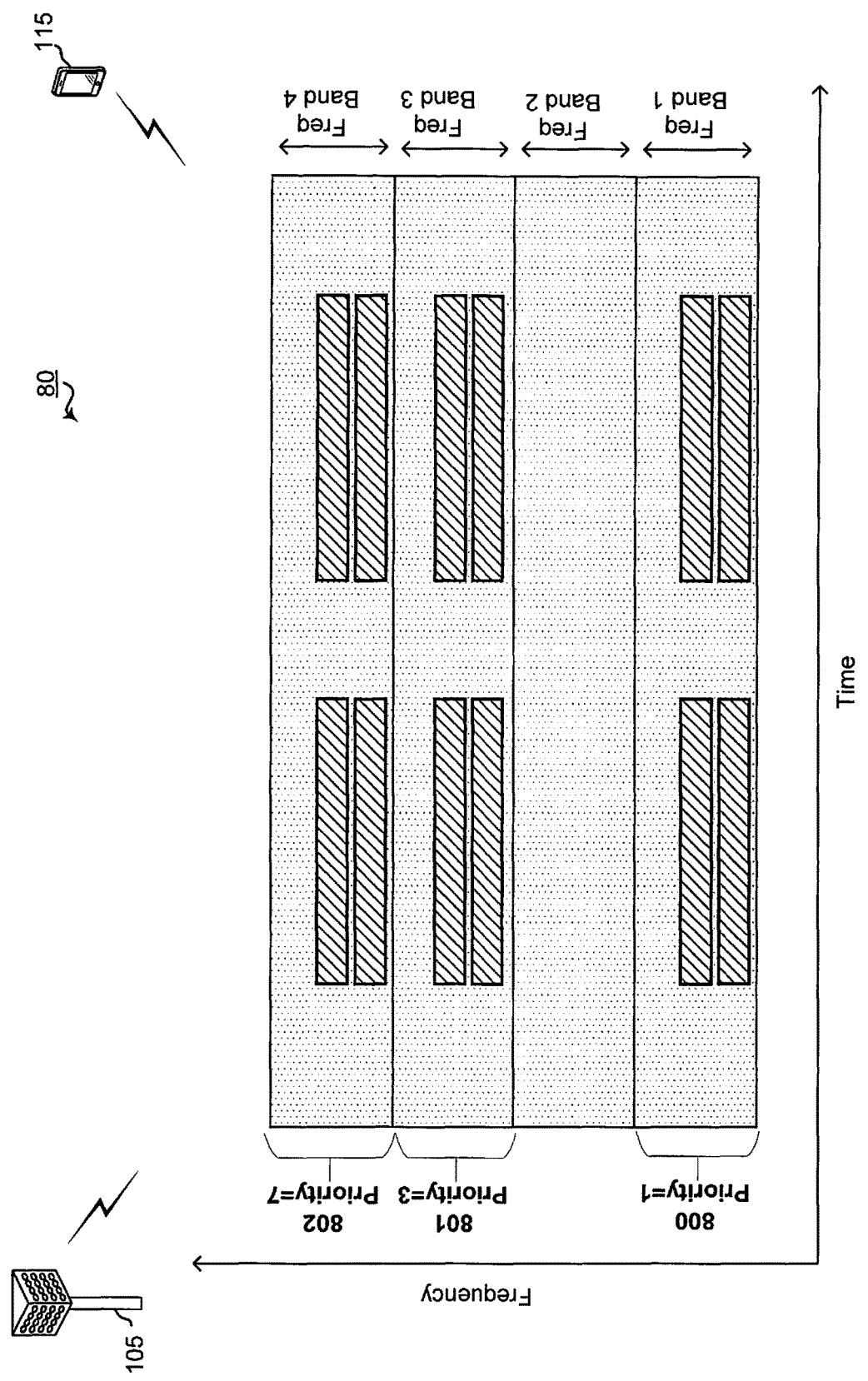
FIG. 8 is a block diagram illustrating a portion of a NR-U network having a base station and UE configured according to aspects of the present disclosure.

FIG. 8 is a block diagram illustrating a portion of NR-U network 80 having base station 105 and UE 115 configured according to aspects of the present disclosure. Base station 105 can associate priorities for random access transmission for each configured frequency band based on congestion or interference in the frequency band. In an additional aspect of the present disclosure, a priority value (priority values 800-802) may be associated to each frequency band where CFRA or CBRA resources are available. In a first optional aspect, base station 105 may signal a congestion level (e.g., channel occupancy percent or channel load) on each frequency band which UE 115 can use to determine a priority associated with each of frequency bands 1-4. In such aspects, a higher priority may be associated with the frequency band having lower congestion. In a second optional aspect, base station 105 may provide an explicit priority value for each frequency band.

In example operation of such aspects, base station 105 may signal to UE 115 either a congestion level for each of frequency bands 1, 3, 4 or a priority value (priority values 800-802). When receiving a congestion level, UE 115 may determine priority value 800-802 for each of frequency bands 1, 3, 4 when determining to select a band for random access. UE 115 may then select the frequency band, frequency band 1 having the best priority value.

In an alternative aspect illustrated by FIG. 8, UE 115 may select a frequency band for random access transmission using a probability based on the priority value. A higher probability would be associated with a higher priority value. For example, frequency band 1 is assigned priority 1 (priority value 800), which is the highest priority (priority value 800 may either be directly received from base station 105 or UE 115 may determine priority value 800 by assessing the congestion levels received from base station 105, as discussed above. According to a first optional example implementation, if UE 115 is able to perform LBT on multiple frequency bands, then a set is defined as the frequency bands for which LBT succeeds. UE 115 may then choose a frequency band from the given set (e.g., frequency bands 1, 3, 4) for random access based on the probability value that is based on which of frequency bands 1, 3, 4 has the better priority value 800-802). In a second optional example implementation, the set of frequency bands may be composed of all frequency bands where random access resources are available (e.g., frequency bands 1, 3, and 4). UE 115 would perform an LBT procedure on one of these frequency bands based on the probability value or the frequency band of the set that has the better priority value.

NR operations currently define allowing for autonomous random access transmission using the PCell random access resources within either the active BWP, if random access resources are available, and the initial active BWP. This standard concept can be extended in additional aspects of the present disclosure to allow more random access opportunities in other BWPs and secondary cells (SCells). In one such example aspect that may also be illustrated by FIG. 8, for a set of BWPs, UE 115 may select a BWP (e.g., frequency bands 1, 3, or 4) for random access based on either UE 115 selecting any BWP where random access resources are configured, or UE 115 selecting any BWP, but only if random access resources are not configured in the active BWP or initial active BWP, or, UE 115 selecting any BWP, but only if interference or congestion measurement or LBT failures on the active BWP or initial active BWP is greater than a threshold, or, UE 115 selecting a BWP which has minimum value of and interference or congestion measurement or LBT failures, or, UE 115 selecting any BWP, but only if one or more LBT failures are detected on the active BWP or initial active BWP, or UE 115 may perform an LBT procedure on multiple BWPs based on the capabilities of UE 115, in which UE 115 can select a BWP where the LBT succeeds.

In an additional aspect of the present disclosure in which a set of serving cells or supplementary uplinks is configured, UE 115 may select a carrier (e.g., frequency bands 1, 3, or 4) for random access based on either UE 115 selecting any carrier where random access resources are configured, or, UE 115 may select any carrier, but only if LBT failure is detected in the primary UL carrier, or, UE 115 may select any carrier, but only if interference or congestion measurement or LBT failures on the primary UL carrier is greater than a threshold, or, UE 115 selecting a UL carrier which has minimum value of interference or congestion measurement r LBT failures, or, based on the capabilities of UE 115, UE 115 performing an LBT procedure on multiple carriers. UE 115 can then select a carrier where LBT succeeds.

In NR Rel-15, a UE, such as UE 115, may transmit the connection request or Msg3 of the random access procedure in the same cell used for PRACH transmission. UE 115 uses the BWP, as configured by higher layers. For a non-standalone scenario (e.g., license assisted access (LAA) type), the RAR would be received on the PCell, which can indicate which frequency band is acquired by base station 105. The resources used for the connection request or Msg 3 can be scheduled where interference is low or where base station 105 has acquired a COT. In an additional aspect of the present disclosure, the RAR can indicate the serving cell to be used for connection request or Msg3 transmission. This information can also be implicit, such that UE 115 performs connection request or Msg3 transmission on the same cell where the RAR is received. In an alternative aspect, the RAR can indicate a BWP to be used by UE 115 for connection request or Msg3 transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), comprising:
receiving, from a network entity, an autonomous random access configuration-message that configures the UE to perform UE-triggered random access transmissions autonomously, the autonomous random access configuration message identifying one or more random access occasions on a plurality of frequency bands, wherein the one or more random access occasions comprise first one or more random access resources that include one or more contention-free random access (CFRA) resources configured on first one or more frequency bands of the plurality of frequency bands, the autonomous random access configuration message identifying a subset of frequency bands of the plurality of frequency bands available to the UE for the UE-triggered random access transmissions;
transmitting a random access request to the network entity at a selected random access resource of the one or more random access resources on a selected frequency band of the plurality of frequency bands;
monitoring a downlink frequency for a random access response in response to the random access request; and
transmitting a connection request to the network entity in response to detection of the random access response.

2. The method of claim 1, wherein the one or more random access occasions comprise second one or more random access resources that include contention based random access (CBRA) resources in second one or more frequency bands of the plurality of frequency bands that are distinct from the first one or more frequency bands of the plurality of frequency bands,
wherein the autonomous random access configuration message includes one of: a system information message or a semi-static signaling, and
wherein the autonomous random access configuration message further identifies a downlink frequency band associated with each frequency band of the plurality of frequency bands, wherein the UE monitors the downlink frequency band for the random access response.

3. The method of claim 2, wherein each frequency band of the plurality of frequency bands and the downlink frequency band include one of:
a supplemental carrier frequency; or
a serving cell.

4. The method of claim 1, wherein the subset of frequency bands includes a default set of frequency bands and an additional set of frequency bands, wherein the UE-triggered random access transmissions are performed on the default set of frequency bands even without the receiving the autonomous random access configuration message.

5. The method of claim 4, wherein the default set of frequency bands includes one or more of:
an initial access bandwidth part; and
a primary cell.

6. The method of claim 1, further including:
receiving a random access resource configuration identifying one or more contention-free random access (CFRA) resources configured on one or more frequency bands of the plurality of frequency bands, wherein each of the one or more CFRA resources is associated with a reference signal from a target base station.

7. The method of claim 6, wherein the reference signal includes one of: a synchronization signal block (SSB), or a channel state information reference signal (CSI-RS).

8. The method of claim 6, further including:
determining to perform a random access procedure;
measuring a signal strength of the reference signal detected by the UE for an active frequency band including a CFRA resource associated with the reference signal;
performing the random access procedure on the CFRA resource of the active frequency band in response to the signal strength exceeding a threshold signal strength; and
performing the random access procedure on a random access resource of another frequency band of the plurality of frequency bands in response to the signal strength being within the threshold signal strength.

9. The method of claim 1, further including:
obtaining a prioritization indication applicable to the plurality of frequency bands;
determining to perform a random access procedure;
performing the random access procedure using the prioritization indication.

10. The method of claim 9, wherein the obtaining the prioritization indication includes one of:
receiving a downlink control signal identifying one or more priority frequency bands of the plurality of frequency bands, wherein the one or more priority frequency bands include one or more frequency bands on which a target base station has obtained a channel occupancy time (COT); or
receiving the downlink control signal from the target base station on the one or more frequency bands on which the target base station has obtained the COT; and identifying the one or more priority frequency bands as the one or more frequency bands on which the downlink control signal is received.

11. The method of claim 10, wherein the performing the random access procedure includes one of:
performing the random access procedure on a priority frequency band selected from the one or more priority frequency bands; or
performing a listen before talk (LBT) procedure on two or more frequency bands of the plurality of frequency bands; selecting the priority frequency band of the one or more priority frequency bands from one or more frequency bands in which the LBT procedure is successful;
and performing the random access procedure on the priority frequency band.

12. The method of claim 9, wherein the obtaining the prioritization indication includes one of:
receiving a congestion indicator associated with one or more frequency bands of the plurality of frequency bands; and
determining the prioritization indication for each of the one or more frequency bands based on the congestion indicator associated therewith; or
receiving a prioritization indicator for each of the one or more frequency bands of the plurality of frequency bands; or
receiving a success probability indicator for each of the one or more frequency bands of the plurality of frequency bands.

13. The method of claim 12, wherein the performing the random access procedure includes:

determining a success probability for each of the one or more frequency bands based on the prioritization indication associated with each of the one or more frequency bands; and
one of:
performing a listen before talk (LBT) procedure on two or more frequency bands of the plurality of frequency bands; identifying a set of candidate frequency bands as one or more frequency bands of the two or more frequency bands in which the LBT procedure is successful; selecting a priority frequency band from the set of candidate frequency bands with a probability which is based on the success probability from the set of candidate frequency bands; and performing the random access procedure on the priority frequency band; or
performing the LBT procedure on a priority frequency band selected from the plurality of frequency bands with a probability which is based on the success probability from the plurality of frequency bands; and performing the random access procedure on the priority frequency band in response to success of the LBT procedure.

14. The method of claim 1, further including:
establishing a connected state with the base station network entity in response to favorable resolution of the connection request;
determining to perform a UE-triggered random access procedure;
selecting a random access resource of the one or more random access occasions on a frequency band of the plurality of frequency bands; and
performing the UE-triggered random access procedure using the random access resource on the frequency band.

15. The method of claim 14, wherein the selecting the random access resource includes one of:
selecting the random access resource from any of the plurality of frequency bands on which one or more random access resources is configured;
selecting the random access resource from one of the plurality of frequency bands based on one of: interference, congestion measurement, or LBT failure record on the plurality of frequency bands;
selecting the random access resource from one or more non-active frequency bands in response to a determination that one or more active frequency bands have no random access resources configured thereon; or
performing a listen before talk (LBT) procedure and a congestion measurement on one or more frequency bands of the plurality of frequency bands having the one or more random access resources configured thereon; and selecting the random access resource from the frequency band of the one or more frequency bands based one at least one of: a successful result of the LBT procedure or a value of the congestion measurement being below a threshold congestion level.

16. The method of claim 1, further including:
receiving the random access response on the downlink frequency from the network entity;
obtaining a frequency band indication from the random access response, wherein the connection request is transmitted using a transmission frequency band of the plurality of frequency bands identified by the frequency band indication.

17. The method of claim 16, wherein the obtaining the frequency band indication includes one of:

receiving a frequency band indication message from the network entity including the frequency band indication; or identifying the frequency band indication based on the downlink frequency on which the random access response is received.

18. A user equipment (UE) configured for wireless communication, the UE comprising:
at least one processor; and
a memory coupled to the at least one processor,
wherein the at least one processor is configured:
to receive, from a network entity, an autonomous random access configuration message that configures the UE to perform UE-triggered random access transmissions autonomously, the autonomous random access configuration message identifying one or more random access occasions on a plurality of frequency bands, wherein the one or more random access occasions comprise first one or more random access resources that include one or more contention-free random access (CFRA) resources configured on first one or more frequency bands of the plurality of frequency bands, the autonomous random access configuration message identifying a subset of frequency bands of the plurality of frequency bands available to the UE for the UE-triggered random access transmissions;
to detect an autonomous random access configuration message identifying one or more random access occasions on a plurality of frequency bands;
to transmit a random access request to a base station at a selected random access resource of the one or more random access occasions on a selected frequency band of the plurality of frequency bands;
to monitor a downlink frequency for a random access response in response to the random access request; and
to transmit a connection request to the base station in response to detection of the random access response.

19. The UE of claim 18,
wherein the autonomous random access configuration message includes one of: a system information message or a semi-static signaling, and
wherein the autonomous random access configuration message further identifies a downlink frequency band associated with each frequency band of the plurality of frequency bands, wherein the UE monitors the downlink frequency band for the random access response.

20. The UE of claim 18, further including configuration of the at least one processor to receive a random access resource configuration identifying one or more contention-free random access (CFRA) resources configured on one or more frequency bands of the plurality of frequency bands, wherein each of the one or more CFRA resources is associated with a reference signal from a target base station.

21. The UE of claim 20, further including configuration of the at least one processor:
to determine to perform a random access procedure;
to measure a signal strength of the reference signal detected by the UE for an active frequency band including a CFRA resource associated with the reference signal;
to perform, by the UE, the random access procedure on the CFRA resource of the active frequency band in response to the signal strength exceeding a threshold signal strength; and to perform, by the UE, the random access procedure on a random access resource of another frequency band of the plurality of frequency bands in response to the signal strength being within the threshold signal strength.

22. The UE of claim 18, further including configuration of the at least one processor:
to obtain a prioritization indication applicable to the plurality of frequency bands;
to determine to perform a random access procedure;
to perform the random access procedure using the prioritization indication.

23. The UE of claim 22, wherein the configuration of the at least one processor to obtain the prioritization indication includes configuration of the at least one processor to one of:
receive a downlink control signal identifying one or more priority frequency bands of the plurality of frequency bands, wherein the one or more priority frequency bands include one or more frequency bands on which a target network entity has obtained a channel occupancy time (COT); or
receive the downlink control signal from the target network entity on the one or more frequency bands on which the target network entity has obtained the COT; and
identify the one or more priority frequency bands as the one or more frequency bands on which the downlink control signal is received.

24. The UE of claim 23, wherein the configuration of the at least one processor to perform the random access procedure includes configuration of the at least one processor to one of:
perform the random access procedure on a priority frequency band selected from the one or more priority frequency bands; or
perform a listen before talk (LBT) procedure on two or more frequency bands of the plurality of frequency bands; select the priority frequency band of the one or more priority frequency bands from one or more frequency bands in which the LBT procedure is successful;
and perform the random access procedure on the priority frequency band.

25. The UE of claim 22, wherein the configuration of the at least one processor to obtain the prioritization indication includes configuration of the at least one processor to one of:
receive a congestion indicator associated with one or more frequency bands of the plurality of frequency bands; and determine the prioritization indication for each of the one or more frequency bands based on the congestion indicator associated therewith; or
receive a prioritization indicator for each of the one or more frequency bands of the plurality of frequency bands; or
receive a success probability indicator for each of the one or more frequency bands of the plurality of frequency bands.

26. The UE of claim 25, wherein the configuration of the at least one processor to perform the random access procedure includes configuration of the at least one processor to determine a success probability for each of the one or more frequency bands based on the prioritization indication associated with each of the one or more frequency bands; and
configuration of the at least one processor to one of:
perform a listen before talk (LBT) procedure on two or more frequency bands of the plurality of frequency bands; identify a set of candidate frequency bands as one or more frequency bands of the two or more frequency bands in which the LBT procedure is successful; select a priority frequency band from the set of candidate frequency bands with a probability which is based on the success probability from the set of candidate frequency bands; and perform the random access procedure on the priority frequency band; or perform the LBT procedure on a priority frequency band selected from the plurality of frequency bands with a probability which is based on the success probability from the plurality of frequency bands; and perform the random access procedure on the priority frequency band in response to success of the LBT procedure.

27. The UE of claim 18, further including configuration of the at least one processor:

to establish a connected state with the base station in response to favorable resolution of the connection request;

to determine to perform a UE-triggered random access procedure;

to select a random access resource of the one or more random access occasions on a frequency band of the plurality of frequency bands; and to perform the UE-triggered random access procedure using the random access resource on the frequency band.

28. The UE of claim 27, wherein the configuration of the at least one processor to select the random access resource includes configuration of the at least one processor to one of:

select the random access resource from any of the plurality of frequency bands on which one or more random access resources is configured;

selecting the random access resource from one of the plurality of frequency bands based on one of: interference, congestion measurement, or LBT failure record on the plurality of frequency bands;

select the random access resource from one or more non-active frequency bands in response to a determination that one or more active frequency bands have no random access resources configured thereon; or perform a listen before talk (LBT) procedure and a congestion measurement on one or more frequency bands of the plurality of frequency bands having the one or more random access resources configured thereon; and select the random access resource from the frequency band of the one or more frequency bands based one at least one of: a successful result of the LBT procedure or a value of the congestion measurement being below a threshold congestion level.

* * * * *